Feb. 2, 1960

J. B. HEIKEL 2,923,219

MOUNT FOR A CAMERA AND PROMPTER

Filed March 12, 1957

INVENTOR
JOHN B. HEIKEL

BY
ATTORNEYS

Feb. 2, 1960  J. B. HEIKEL  2,923,219
MOUNT FOR A CAMERA AND PROMPTER
Filed March 12, 1957  2 Sheets-Sheet 2

INVENTOR
JOHN B. HEIKEL
ATTORNEYS

2,923,219

MOUNT FOR A CAMERA AND PROMPTER

John B. Heikel, Landover Hills, Md.

Application March 12, 1957, Serial No. 645,649

5 Claims. (Cl. 95—12)

(Granted under Title 35, U.S. Code (1952), sec. 266)

The invention described herein may be manufactured and used by or for the Government of the United States of America for governmental purposes without the payment of any royalties thereon or therefor.

The present invention relates to a mount for a camera and a prompter and more particularly to a mount for a camera and a prompter which is mounted on a movable support.

A prompter is generally used in connection with television or newsreel productions, in which there is little time to prepare and to engage in long rehearsals prior to the production itself. It is desirable to mount the prompter on a movable camera support so that the actor can read his lines or script on the prompter while looking directly into the camera.

In the past, difficulty had been encountered when auxiliary equipment, such as a prompter, was mounted on the movable camera support as there was no suitable mount available. The mounts that were used were inadequate because: the additional weight of the prompter would unbalance the camera and camera support; the prompter would be so mounted as to prevent the cameraman from making the many adjustments needed during the production, such as changing the lenses, adjusting the f/stop and focus, without detaching the prompter from the mount; and the mount could only be used with one type of camera.

An object of the present invention is the provision of a novel type of mount.

Another object is to provide a mount that is simple, inexpensive to make, and adapted to be quickly installed.

A further object of the invention is the provision of a mount that allows a prompter and a camera to be mounted on a movable camera support in a balanced condition.

Still another object is to provide a mount that would allow the prompter to be moved away from the camera without detaching it so that the cameraman can make any adjustments to the camera that are needed.

A final object of the present invention is the provision of a mount that can support a prompter and any type of camera.

Other objects and many of the attendant advantages of this invention will be readily appreciated as the same becomes better understood by reference to the following detailed description when considered in connection with the accompanying drawings wherein.

Figure 1:
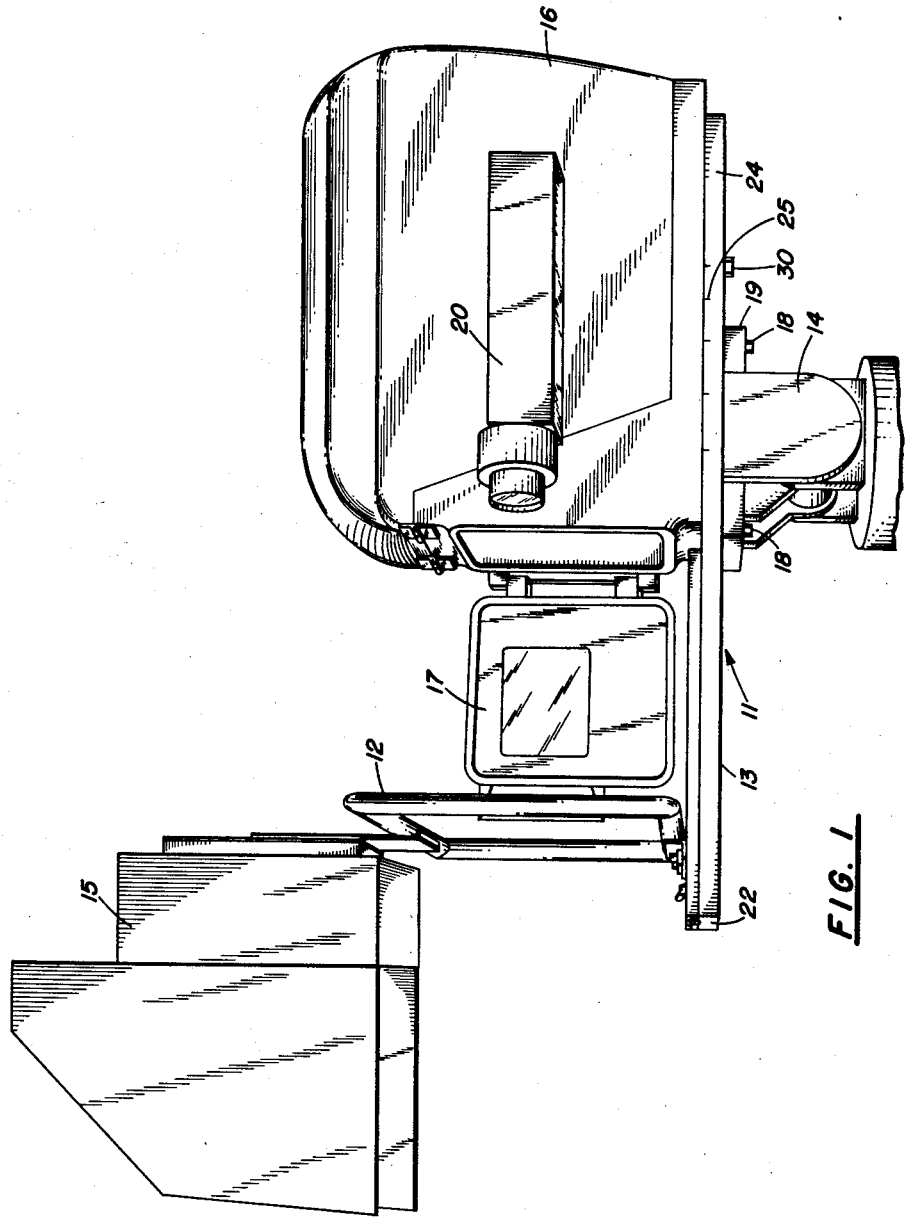
Fig. 1 shows a side perspective view of a preferred embodiment of the invention installed.

Referring now to the drawings, wherein like reference characters designate like or corresponding parts throughout the several views, there is shown in Fig. 1 a mount 11 including an open rectangular vertical frame 12 adjustably connected to a base plate 13 which is mounted on a movable camera support 14. A prompter 15 is supported by the open frame 12, and a camera 16 is mounted on the base plate 13.

The camera support 14 can be any suitable movable camera support but preferably is of the type having a boom and a seat to allow the cameraman to ride with the support when moved. In the position shown in Fig. 1, the frame 12 is in a forward position allowing a windowed door 17 of the camera 16 to be opened so that a cameraman can make any adjustments to the camera that are needed. A conventional sight 20 is provided on the camera 16 to allow the cameraman to line up the subject to be photographed with the optical axis of the camera that passes through the window of door 17 and through the open frame 12.

Figure 2:
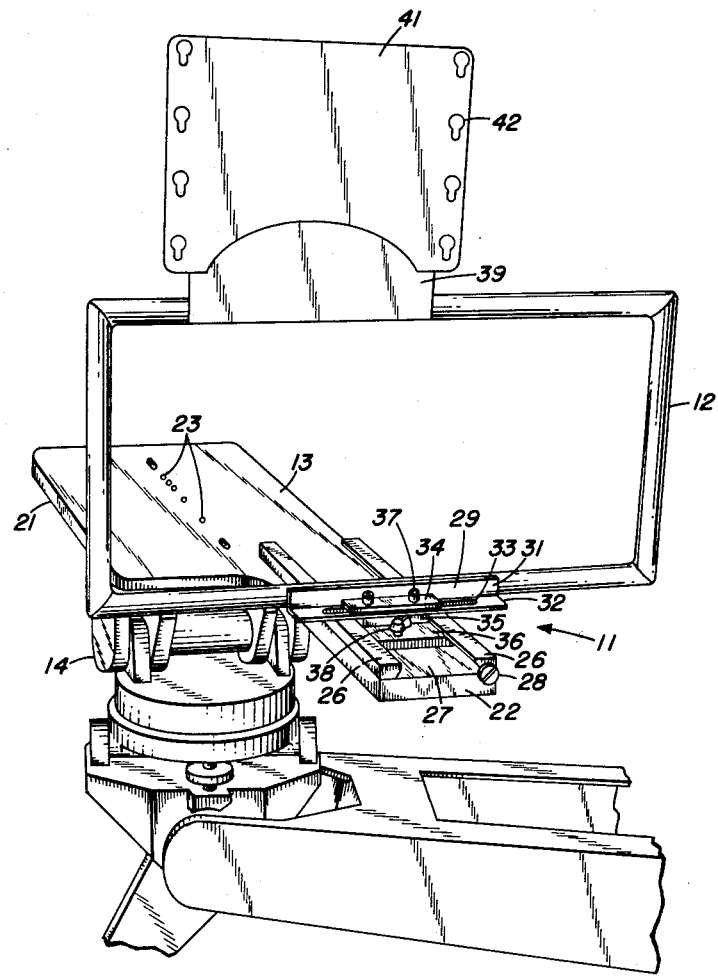
Fig. 2 illustrates a front perspective view of the mount mounted on a movable camera support.

Referring to Fig. 2 the mount 11 is shown mounted on the camera support 14; however the prompter 15 and the camera 16 are detached to more clearly show the details of the mount 13. The base plate 13 can be secured to the camera support by any suitable means which does not interfere with the seating of the camera 16 on the upper surface of the base plate 13. As shown in Fig. 1, tap bolts 18 are inserted through openings in plate 19 of the camera support 14 and threadedly engage tapped holes in the underside of the base plate 13 to secure the base plate 13 onto the camera support 14.

The base plate 13 has a main body portion 21 and a forwardly extending arm portion 22. The body portion 21 has a plurality of spaced through holes 23 therein positioned in a row and whose function will be more fully described hereinafter. The side 24 of the body portion 21 is provided with indicating marks 25 which are spaced the same distance as and are in cross alignment with the holes 23. The marks 25 are preferably the names of the various makes and types of cameras that are to be used in combination with the prompter 15.

The arm portion 22 is provided with oppositely facing guides 26 that are fixed thereto by any suitable means. The side of each of the guides 26 facing each other form an acute angle with the arm portion 22 providing a slideaway 27 therebetween. A screw 28 is provided in the forward end of the arm 22 and protrudes into the slideway 27 to act as a stop.

The lower end of the frame 12 is provided with an L-shaped bracket 29 having a vertical leg 31 and a horizontal leg 32. The horizontal leg 32 is provided with a longitudinally extending slot 33 therethrough and rests on the guides 26. A clamping plate 34 is positioned over the slot 33, and a spacer 35 is positioned under the slot 33 between the guides 26. The spacer 35 is fixed to a sliding shoe 36 which is shaped to form a dovetail connection with slideway 27.

Adjusting screws 37 pass through the clamping plate 34, slot 33 and are threadedly received in the spacer 35. By loosening the screws 37 the frame 12 by means of the slot 33 can be centered or off-set from the center of the arm 22 to suit different type cameras and/or prompters.

The shoe 36 is provided with a locking bolt 38 that is threadedly received by a hole therethrough. The end of the bolt 38 is adapted to lockingly engage the upper surface of the arm 22 which is part of the slideway 27.

Supporting plates 39 and 41 are provided on the upper side of the frame 12 with any suitable fastening means associated therewith, such as the key-hole slots 42 for hanging the prompter 15 thereon.

The cameras that are to be used with the prompter mount 11 differ in weight. Therefore, if only one hole 23 was provided in the base plate 13, the assemblage would be in balance with one weight camera only. In view of this, a plurality of mounting holes 23 are provided in the base plate 13 and positioned to compensate for the different weights of the different types of cameras. The marks 25 representing names of different type cameras are provided on the side 24 of the base plate 13 for convenience in lining up the proper hole 23 with the particular camera to be used. When the proper hole 23 is selected for the camera to be used, a bolt 30 is inserted through the hole 23 and threadedly engaged in a tapped hole in the bottom of the camera.

In operation, the camera 16 is mounted in one of the holes 23 and the prompter 15 is supported on the plates 39 and 41. In actual use, the frame 12 is positioned adjacent the camera 16. In this position, the frame 12 can be adjusted on the arm 22 by means of screws 37 and slot 33, to allow the optical axis of the camera 16 to pass therethrough. When adjustments have to be made to the camera 16, the locking bolt 38 is unlocked from the upper surface of the arm 22 and the prompter 15, frame 12, and shoe 36 are moved forward to the position shown in Fig. 1. After the necessary adjustments to the camera 16 are made, the prompter 15 is then returned to the operating position.

It can thus be seen that when a prompter and camera are mounted on the mount 11, the mount 11 will be in a balanced condition on the support 14.

Obviously many modifications and variations of the present invention are possible in the light of the above teachings. It is therefore to be understood that within the scope of the appended claims the invention may be practiced otherwise than as specifically described.

What is claimed is:

1. In combination with a movable support, a mount mounted at an intermediate point on said support and having its ends extending beyond said support, a prompter, an open frame for supporting said prompter, guide means on one end of said mount and cooperating slide means secured to said frame whereby said frame and prompter may be selectively positioned longitudinally of said mount, camera mounting means longitudinally arranged on the other end of said mount for mounting any one of a plurality of different types of cameras having different weights on said mount in a balanced condition with said prompter, and a camera mounted on said other end of said mount by said camera mounting means in a balanced condition with said prompter and facing toward said prompter.

2. The combination set forth in claim 1, said open frame allowing the light rays from the subject to pass therethrough, and said prompter being mounted on said frame in a position displaced from the optical axis of said camera.

3. The combination set forth in claim 2 including means for adjusting the position of said prompter and frame transversely of the optical axis of said camera.

4. In combination with a movable support, a mount mounted on said support, said mount comprising a horizontal base plate and a vertical frame, means mounting said plate at an intermediate point on said support with its ends extending beyond said support, means adjustably connecting said frame to one end of said plate for longitudinal movement, a prompter mounted on said frame, camera mounting means longitudinally arranged on the other end of said plate for mounting any one of a plurality of different types of cameras having different weights on said plate in a balanced condition with said prompter, a camera mounted on said other end of said plate by said last mentioned means in a balanced condition with said prompter and facing toward said prompter, said frame being selectively movable from a position adjacent said camera to a position away from said camera in a direction along the optical axis of said camera.

5. The combination set forth in claim 4 including means adjustably mounting said prompter and said frame for movement transversely of the optical axis of said camera.

References Cited in the file of this patent

UNITED STATES PATENTS

| 1,892,846 | Mueller | Jan. 3, 1933 |
| 2,667,825 | Nicholas | Feb. 2, 1954 |
| 2,796,814 | Cuneo et al. | June 25, 1957 |